(12) United States Patent
Thomas et al.

(10) Patent No.: US 7,342,395 B2
(45) Date of Patent: Mar. 11, 2008

(54) FUEL LEVEL SENSOR USING ROTATING ANGEL SENSOR ATTACHED TO FLOAT ON TOTATING ARM

(75) Inventors: Alan Douglas Thomas, Berks (GB); Brian Johnson, Devon (GB)

(73) Assignee: First Inertia Switch Limited, Farnborough, Hampshire (GB)

( * ) Notice: Subject to any disclaimer, the term of this patent is extended or adjusted under 35 U.S.C. 154(b) by 0 days.

(21) Appl. No.: 10/598,960

(22) PCT Filed: Mar. 18, 2005

(86) PCT No.: PCT/GB2005/001036

§ 371 (c)(1),
(2), (4) Date: Sep. 19, 2006

(87) PCT Pub. No.: WO2005/090933

PCT Pub. Date: Sep. 29, 2005

(65) Prior Publication Data

US 2007/0176598 A1    Aug. 2, 2007

(30) Foreign Application Priority Data

Mar. 19, 2004    (GB) ................................ 0406278.2

(51) Int. Cl.
*G01B 7/30* (2006.01)
*G01R 33/07* (2006.01)

(52) U.S. Cl. .............................. 324/207.25; 324/207.2; 324/251

(58) Field of Classification Search ..............................
324/207.24–207.25, 173–174, 207.2, 251;
73/514.16, 514.31, 514.39; 338/32 R, 32 H
See application file for complete search history.

(56) References Cited

U.S. PATENT DOCUMENTS

| 6,518,749 | B1 * | 2/2003 | Oudet et al. ............. 324/207.2 |
| 6,593,734 | B1 | 7/2003 | Gandel et al. |
| 2004/0003660 | A1 | 1/2004 | Fukuhara et al. |
| 2005/0127903 | A1 * | 6/2005 | Sogge ..................... 324/207.2 |

FOREIGN PATENT DOCUMENTS

EP    1 376 077    1/2004

* cited by examiner

*Primary Examiner*—Bot LeDynh
(74) *Attorney, Agent, or Firm*—Renner, Otto, Boisselle & Sklar, LLP

(57) ABSTRACT

A fuel level sensor having a magnetic position sensor connected to an arm for attachment to a float, wherein the magnetic position sensor comprises a stator and a movable part, the stator having two soft magnetic pieces defining an air gab, which contains a magnetoresistive probe for measuring the variation in induction in the gap, the moveable part comprising a yoke of soft magnetic materiel displaceable parallel to the magnetic pieces of the stator, and a magnet partly embedded in a cavity in the yoke facing the stator, the poles of the magnet being polarized perpendicularly to direction of movement of the moveable part relative to the stator.

20 Claims, 2 Drawing Sheets

FUEL LEVEL SENSOR USING ROTATING ANGEL SENSOR ATTACHED TO FLOAT ON TOTATING ARM

This application is a national stage filing under 35 U.S.C. 371 of International Application No. PCT/GB05/01036 filed Mar. 18, 2005 and published in the English language, which claims priority from United Kingdom Application No. 0406278.2, filed Mar. 19, 2004, the specification of which is incorporated by reference herein.

The present invention relates to a fuel level sensor.

U.S. Pat. No. 6,593,734, the disclosure of which is incorporated herein, discloses a magnetic position sensor having a stator and a movable part. The stator has two soft magnetic pieces defining an air gap which contains a magnetosensitive probe, for example a Hall effect sensor, for measuring the variation in induction in the gap. The moveable part comprises a yoke of soft magnetic material displaceable parallel to the magnetic pieces of the stator and a magnet partly embedded in the yoke. The magnet's poles are parallel to the pieces of the stator. Movement of the magnet relative to the stator varies the magnetic field in the air gap and the magnetosensitive probe produces a signal representing the position of the magnet relative to the stator.

Most fuel level sensors, currently in use, use a float connected by a pivoted arm to a conductive wiper which moves along an electrically resistive strip. This causes the resistance of the sensor to change with the movement of the wiper. The change in current through the strip indicates variations in fuel level. These sensors operate inside the fuel tank, often attached to an assembly containing the fuel pump. The wiper and resistive strip are exposed to the fuel. The fuel level sensor is expected to operate reliably for a long period of time. However, the strip is continually rubbed by the wiper, some fuels are corrosive, and it has been found that cleaner fuels aggravate wear. Also, to keep the contact of the wiper clean and to burn off films deposited by the fuel on the sensor, an operating current of tens of milliamps is often used.

The present invention provides a fuel level sensor having a magnetic position sensor connected to an arm for attachment to a float, wherein the magnetic position sensor comprises a stator and a movable part, the stator having two soft magnetic pieces defining an air gap which contains a magnetosensitive probe for measuring the variation in induction in the gap, the moveable part comprises a yoke of soft magnetic material displaceable parallel to the magnetic pieces of the stator and a magnet joined to the yoke, the poles of the magnet being polarised perpendicularly to the direction of movement of the moveable part relative to the stator.

Suitably, the magnet's poles are parallel to the pieces of the stator. Movement of the magnet relative to the stator varies the magnetic field in the air gap and the magnetosensitive probe produces a signal representing the position of the magnet relative to the stator.

Suitably, the magnet is partly embedded in a cavity in the yoke.

Such a magnetic position sensor has a stator and moveable part which do not contact each other thus avoiding wear due to rubbing of two parts. The use of a magnetic sensor having a magnetosensitive probe, for example a Hall effect sensor, reduces the current consumption. The current consumption is further reduced because there is no need to provide a current to burn off films deposited by the fuel or to keep wiper contacts clean.

Fuel level sensors are often positioned in close proximity to the fuel pump to facilitate assembly in the fuel tank. It is a feature of the present invention that it provides robust immunity to magnetic fields caused either by pump motor magnetic fields or proximity to of ferrous casings or supports. These fields may influence other sensing techniques, for instance those which rely on magnetic flux orientation detection more readily and can require additional magnetic shielding.

In an embodiment, the magnetosensitive probe is Hall effect sensor. In a currently preferred embodiment, the Hall effect sensor is part of an Integrated Circuit (IC) also having an arithmetic circuit and some memory.

The IC may be pre-programmed to set minimum and maximum outputs to reduce mechanical errors.

In an embodiment, the IC has two power leads which also act a signalling leads to indicate the fuel level. The IC converts the position signal from the magnetic position sensor to a binary, Pulse Code Modulated, signal which is a modulation of power supply current, for example 5 mA for one level and 10 mA for the other.

Modern vehicles have at least one computer for instruments and engine management. In an embodiment of the invention, the vehicle's computer converts the fuel level signal from the fuel level sensor to an instrument reading taking account of the shape of the fuel tank. Alternatively, the IC, of which the Hall sensor forms part, may include a means for calibrating the output of the fuel level sensor to suit the shape of a fuel tank. Such means may be a programmable device, for example a look up table, which can be programmed according the shape of any fuel tank. Thus any need to design different sensors for different fuel tanks (apart from programming) may be avoided.

The IC may also provide other information, for example fault indication and/or part identification. The IC may also provide other signal processing, for example temperature compensation.

An embodiment of the fuel level sensor has at least the position sensor, in a housing or encapsulation, fully immersible in fuel. At least the position sensor may be encapsulated in suitable encapsulant. One example of a suitable encapsulant is vinyl ester resin.

The invention also provides a fuel tank containing the fuel level sensor. The invention also provides a vehicle comprising the fuel level sensor.

For a better understanding of the present invention, reference will now be made, by way of example, to the accompanying drawings in which.

Figure 1:
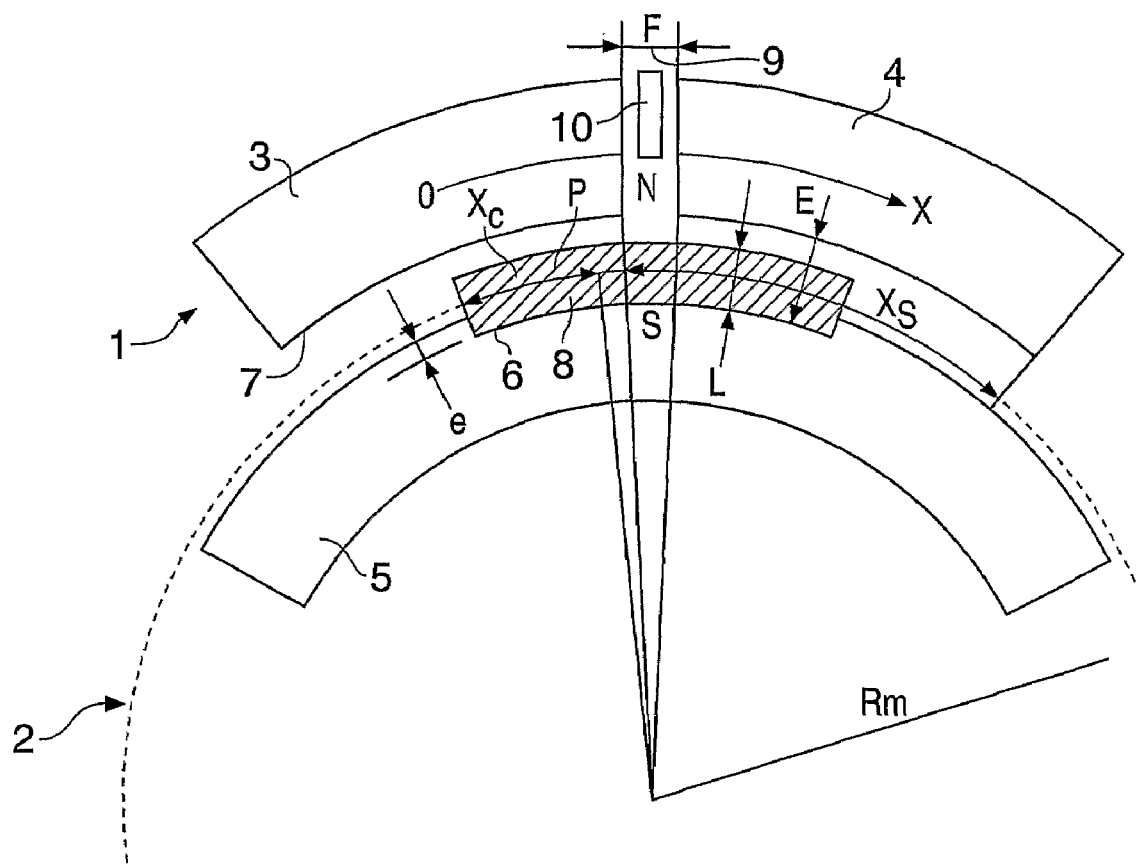
FIG. 1 is a schematic view of a magnetic position sensor.

The sensor of FIG. 1 is provided with a fixed stator (1) and a part (2) which is movable in the direction OX, with a useful stroke Xc over which the delivered signal has great linearity.

The stator is provided with two stator pieces (3, 4) of a soft magnetic material in the form of annular quadrants. Movable part (2) has a soft iron yoke (5) of semiannular form. Stator pieces (3, 4) and yoke (5) define between them a primary air gap (7). Yoke (5) has a cavity (6) in which there is housed a magnet (8) magnetized perpendicular to air gap (7), or in radial direction in the present case.

The stator has two ferromagnetic pieces (3, 4) spaced apart by a secondary air gap (9) of length F, in which there is placed a magneto-sensitive probe (10). The two stator pieces (3, 4) are joined by nonmagnetic pieces made of brass, for example, and are aligned in the same cylindrical surface, whose axis is the axis of rotation of the movable part.

The stroke Xc is the width of the angular arc travelled by the movable part over the mean radius Rm of the magnetized part. The stroke of the magnet extends by ±Xc/2 relative to the center of the secondary air gap, in which the magneto-sensitive probe is disposed perpendicular to the primary air gap.

The movable part (2) is provided with a yoke (5) of soft magnetic material and a permanent magnet (8) partly embedded in yoke (5). Magnet (8) is polarized radially, or in other words perpendicular to OX. Movable part (2) is displaced parallel to stator pieces (3, 4) at a constant minimal distance Yo measured perpendicular to OX.

Permanent magnet (8) is partly embedded in a cavity situated substantially at the center of movable yoke (5), on the side of stator pieces (3, 4), at a depth e such that 0.1 L<e<0.9 L, where L is the thickness of magnet (8) in the polarization direction. Depth e is determined in such a manner as to optimize the characteristics of the sensor.

Permanent magnet (8) is displaced together with yoke (5) parallel to stator pieces (3, 4) at a constant minimum distance E-L, where E is the distance between the stator pieces and the cavity bottom, measured perpendicular to OX. Yoke (5) is situated at a minimum distance from the stator equal to Yo=E-e, which is larger than E-L.

Width Xs of stator pieces (3, 4) measured over the means radius Rm of magnet (8) is greater than or equal to Xc, preferably substantially equal to Xc+2 E', in order to obtain a signal with great linearity over the entire stroke Xc, where E' ranges between e/4 and E.

Preferably the width of the cavity in movable yoke (5) and of magnet (8), measured over the mean radius Rm of magnet (8), is larger than or equal to Xc+F, preferably substantially equal to Xc+F+2 E'.

According to an advantageous modification, the width of movable yoke (5) measured over the mean radius Rm of magnet (8) is equal to at least 3 Xc+F+6 E'.

According to an advantageous modification, the L/E ratio is greater than or equal to 0.5, and preferably greater than or equal to 0.75.

According to an advantageous modification, the Xs/E ratio is relatively large, preferably greater than 8.

According to an advantageous modification, magnet (8), movable yoke (5) and ferromagnetic stator pieces (3, 4) have the same length Z measured along the axis perpendicular to the direction of magnetization and to the direction of displacement OX, and preferably greater than or equal to 3 E.

These advantageous modifications make it possible to define a sensor with an optimal geometry and volume of magnet (8) adapted to the desired measurement range.

Magneto-sensitive probe (10) can be a Hall-effect probe, a magneto-resistive probe, a magnetic transistor, etc. What is important is that the delivered signal depends as linearly as possible on the magnetic induction in which this element is placed.

Permanent magnet (8) can be of different types, and preferably there will be used a magnet (8) of samarium-cobalt or NdFeB, or possibly even a magnet (8) of AlNiCo or ferrite type, etc. It has a reversible permeability close to 1, and preferably less than 1.2, in order to obtain good linearity of the signal. It will be preferable to choose a magnet (8) with a low temperature coefficient.

The ferromagnetic stator parts and movable yoke (5) can be made of iron-nickel, iron-silicon, pure iron, etc.

It is not necessary to introduce a guide piece for magnet (8), since it is directly fixed on movable yoke (5). The embedding of magnet (8) is yoke (5) also makes it possible to reduce the sensitivity of the sensor to the quality of bonding of magnet (8), and it facilitates placement of the magnet on yoke (5) during production operations.

It is possible to minimize the volume of magnet (8) or to increase the induction variation ΔB and thus the signal-to-noise ratio.

The depth e of the cavity provided in movable yoke (5) is chosen judiciously in order to increase, relative to the case without cavity (e=0), with an identical magnet (8) and the same overall outside dimensions, the magnetic induction delivered by the magnetic circuit to magneto-sensitive probe (10), and/or in order to improve the linearity of the sensor along the stroke.

The embedding of permanent magnet (8) modifies the distribution and amplitude of leakage fluxes, and thus makes it possible to influence the linearity of the sensor. It can be shown that the linearity varies as a function of the depth of cavity (6) in which permanent magnet (8) is partly embedded.

Figure 2:
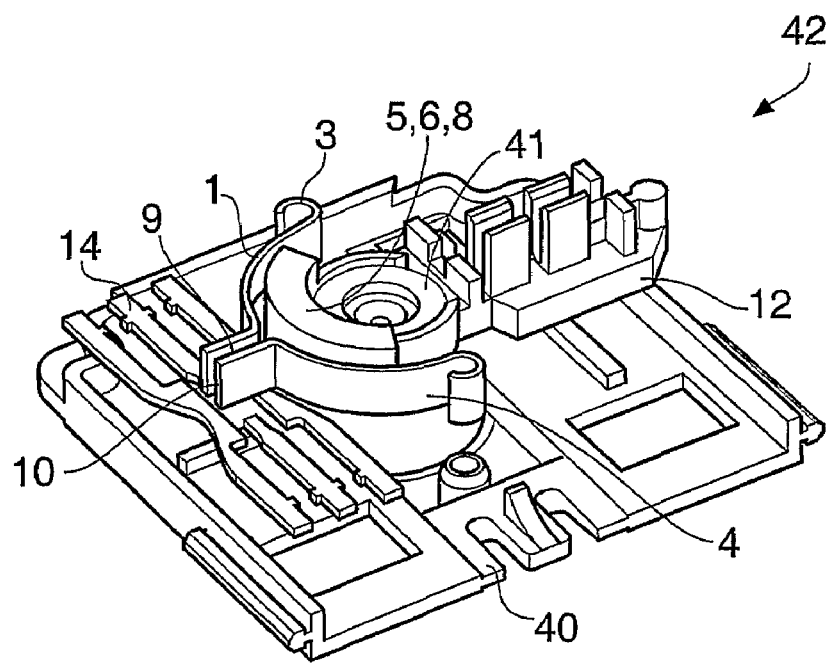
FIG. 2 is a schematic view of a vehicle fuel level sensor incorporating a sensor as shown in FIG. 1.

Referring to FIG. 2, the vehicle fuel level sensor 42 of FIG. 1 comprises a base frame 40 which may be a plastics moulding. The base frame 40 supports the stator 1 comprising the pole pieces 3,4 defining the air gap 9 in which is the Hall effect sensor 10. The base frame 40 also supports a lead frame 14 of electrical connectors connecting to the Hall effect sensor. The yoke 5 has the magnet 8 partly embedded in the cavity 6. The yoke pivots on a bearing 41. The yoke is connected to an arm 12 for attachment to a float (not shown).

Figure 3:
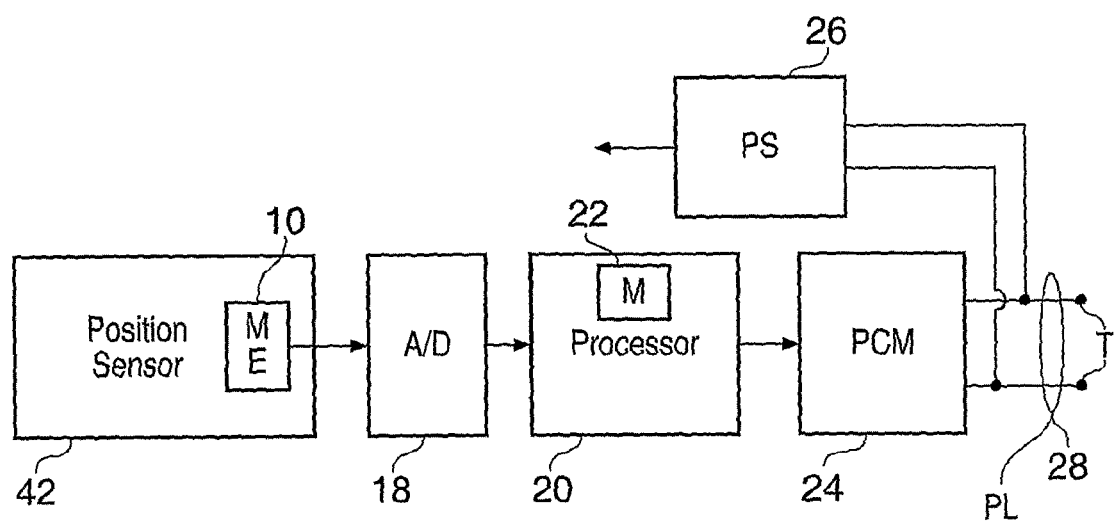
FIG. 3, is a block diagram of the fuel level sensor of FIG. 2.

Referring to FIG. 3, the fuel level sensor 42 of FIGS. 1 and 2 comprises the Hall effect sensor 10 which is connected to an analogue to digital (A/D) converter 18. The output of the A/D converter is connected to a signal processor 20 which is for example a digital processor including an arithmetic circuit and memory M, 22. The output of the processor is connected to a Pulse Code Modulator 24 which binary modulates the current flowing in power supply leads 28 connected to terminals T. The binary symbols may be currents of 5 mA and 10 mA for example, although any other suitable values may be used. A power supply 26 supplies DC to the elements 42, 18, 20 and 24 unaffected by the modulation of the current in the leads 28.

In another version of the sensor of FIG. 3 the Hall effect sensor 10 is part of an IC also comprising the A/D converter 18 and the processor 20, and optionally also the modulator 24.

The memory 22 may store a look up table LUT for calibrating the output of the Hall effect sensor with the shape of the fuel tank. The processor 20 addresses the LUT in accordance with the output of the Hall sensor 16 and reads out values which, for example, are a linearly related to the volume of fuel in the tank regardless of the shape of the tank.

Alternatively, a vehicle may have a computer for operating the vehicle instruments including the fuel gauge, and which stores such a look up table and the processor supplies to the computer via the modulator 24 the "raw" output of the Hall sensor.

The processor 20 may provide other functions for example one or more of: fault indication: part identification; and temperature compensation.

The fuel level sensor 42 may be part of a fuel pump.

Whilst the example of FIG. 3 uses digital signal processing, another example of the fuel level sensor provides an analogue signal representing fuel level.

At least the position sensor 42 is housed in a fuel tight housing or encapsulated in encapsulant, so that it is fully immersible in fuel. A suitable encapsulant is vinyl ester resin.

The position sensor 42 provides immunity to external magnetic fields. The fuel sensor is simple.

The invention claimed is:

1. A fuel level sensor having a magnetic position sensor connected to an arm for attachment to a float, wherein the magnetic position sensor comprises a stator and a movable part, the stator having two soft magnetic pieces defining an air gap which contains a magnetosensitive probe for measuring the variation in induction in the gap, the moveable part comprising a magnet displaceable parallel to the magnetic pieces of the stator and facing the stator, the poles of the magnet being polarized perpendicularly to direction of movement of the moveable part relative to the stator, wherein each of the two soft magnetic pieces of the stator comprises a strip which is bent away from the magnet to define said air gap.

2. A sensor according to claim 1, wherein the magnetosensitive probe is a Hall effect sensor.

3. A sensor according to claim 2, further comprising a signal processor for processing a signal produced by the magnetic position sensor and representing the position of the moveable part relative to the stator.

4. A sensor according to claim 3, wherein the signal processor and the magnetosensitive probe are parts of the same integrated circuit.

5. A sensor according to claim 3, wherein the sensor has two power terminals and the signal processor is operable to output the signal representing the position of the moveable part relative to the stator on the power terminals.

6. A sensor according to claim 5 wherein the said signal is a Pulse Code Modulated signal.

7. A sensor according to claim 3, wherein the signal processor is operable to provide fault indication and/or part identification.

8. A sensor according to claim 3, wherein the signal processor is operable to provide temperature compensation.

9. A sensor according to claim 1 in combination with a fuel pump.

10. A sensor according to claim 1, wherein at least the magnetic position sensor is encapsulated in encapsulant.

11. A sensor according to claim 10, wherein the encapsulant is vinyl ester resin.

12. A sensor according to claim 3, wherein the signal processor is programmable to calibrate the output of the sensor to the shape of a fuel tank.

13. A vehicle comprising a sensor according to claim 1.

14. A vehicle comprising a sensor according to claim 13, and a computer arranged to calibrate the output of the sensor to the shape of a fuel tank of the vehicle.

15. A fuel tank containing a fuel level sensor according to claim 1.

16. A sensor according to claim 1, wherein the moveable part further comprises a yoke of soft magnetic material, and wherein the magnet is partly embedded in a cavity in the yoke.

17. A sensor according to claim 16, wherein the magnetosensitive probe is a Hall effect sensor.

18. A sensor according to claim 17, further comprising a signal processor for processing a signal produced by the magnetic position sensor and representing the position of the moveable part relative to the stator.

19. A sensor according to claim 18, wherein the signal processor and the magnetosensitive probe are parts of the same integrated circuit.

20. A sensor according to claim 18, wherein the sensor has two power terminals and the signal processor is operable to output the signal representing the position of the moveable part relative to the stator on the power terminals.

* * * * *